United States Patent [19]

Platt

[11] 3,771,804
[45] Nov. 13, 1973

[54] COMPOUND CHUCK STRUCTURE

[76] Inventor: William G. Platt, 3930 Harvard Rd., Detroit, Mich. 48224

[22] Filed: Mar. 18, 1971

[21] Appl. No.: 125,500

[52] U.S. Cl. .............................................. 279/121
[51] Int. Cl. .......................................... B23b 31/16
[58] Field of Search ...................... 279/121, 122, 70, 279/110

[56] References Cited
UNITED STATES PATENTS 3,188,102  6/1965  Mott ................................. 279/121
3,252,710  5/1966  Buck ................................. 279/121

*Primary Examiner*—Gil Weidenfeld
*Attorney*—Whittemore, Hulbert & Belknap

[57] ABSTRACT

Compound wedge type chuck structure including a lower slide, a top jaw and inclined wedge and pin structure positioned between the lower slide and top jaw for multiplying the movement of the top jaw and the force applied by the top jaw in response to radial movement of the lower slide in engagement through an inclined surface with an actuating drawbar on application of actuating force to the drawbar.

7 Claims, 6 Drawing Figures

PATENTED NOV 13 1973 3,771,804

INVENTOR.
WILLIAM G. PLATT
BY Whittemore
Hulbert & Belknap
ATTORNEYS

INVENTOR.
WILLIAM G. PLATT
BY Whittemore
Hulbert & Belknap
ATTORNEYS

COMPOUND CHUCK STRUCTURE

BACKGROUND OF THE INVENTION

1. Field of the Invention

The invention relates to machine tool chucks or the like and refers more specifically to compound chuck structure for use with lathes or the like including means for moving jaw members of the chuck a distance and with a force which is a compound multiple of the movement and force producing the movement of chuck actuating means.

2. Description of the Prior Art

In the past, chuck structures have generally been limited to a single inclined plane or lever type mechanical advantage so that jaw movement of prior chucks has been restricted wherein high chucking pressures have been required. Conversely, chucking pressures have been limited where large jaw movement has been required such as with automatic loading structure.

Thus, both chucking pressure and jaw movement have been severely limited by the actuating angle of prior single action wedge type chucks and by the length of levers in prior single action chucks actuated by means of bell cranks or other lever structures.

SUMMARY OF THE INVENTION

In accordance with the present invention, a plurality of separate multiplying structures such as inclined planes are positioned within chuck structure between the actuating mechanism therefore and movable jaw structures thereof to provide a much wider range of jaw movement and chucking force in response to a predetermined movement of chuck actuating mechanism and actuating forces than is possible with single action chuck structures. As a result, the chuck structure of the invention will provide much more power for gripping parts in response to a predetermined actuating force or, if desired, a much greater jaw movement than previously possible with a predetermined movement of an actuating member which is of advantage in automatic loading equipment is possible.

Specifically, the chuck disclosed is a wedge type chuck and the compound actuating structure includes separate pins positioned adjacent each jaw structure of the chuck having oppositely inclined flat surfaces thereon and a center wedge positioned between the flat surfaces of the pins with the ends thereof engaged therewith, which center wedge is also engaged with the associated jaw structure on opposed inclined planes to produce movement of the jaw structure radially of the chuck structure in accordance with the movement of the center wedge transversely of the chuck structure.

The center wedge extends radially of the chuck structure beyond the pins to permit the use of a knocker to release chucked members if the angle between the center wedge and top jaw is a locking angle relative to movement of the top jaw radially of the jaw structure. Clearance is also provided between the lower slide and actuating drawbar structure to permit jolting of the lower slide by the drawbar structure when direction of movement of the drawbar is changed to facilitate release of chucked workpieces.

DESCRIPTION OF THE PREFERRED EMBODIMENT

Figure 1:
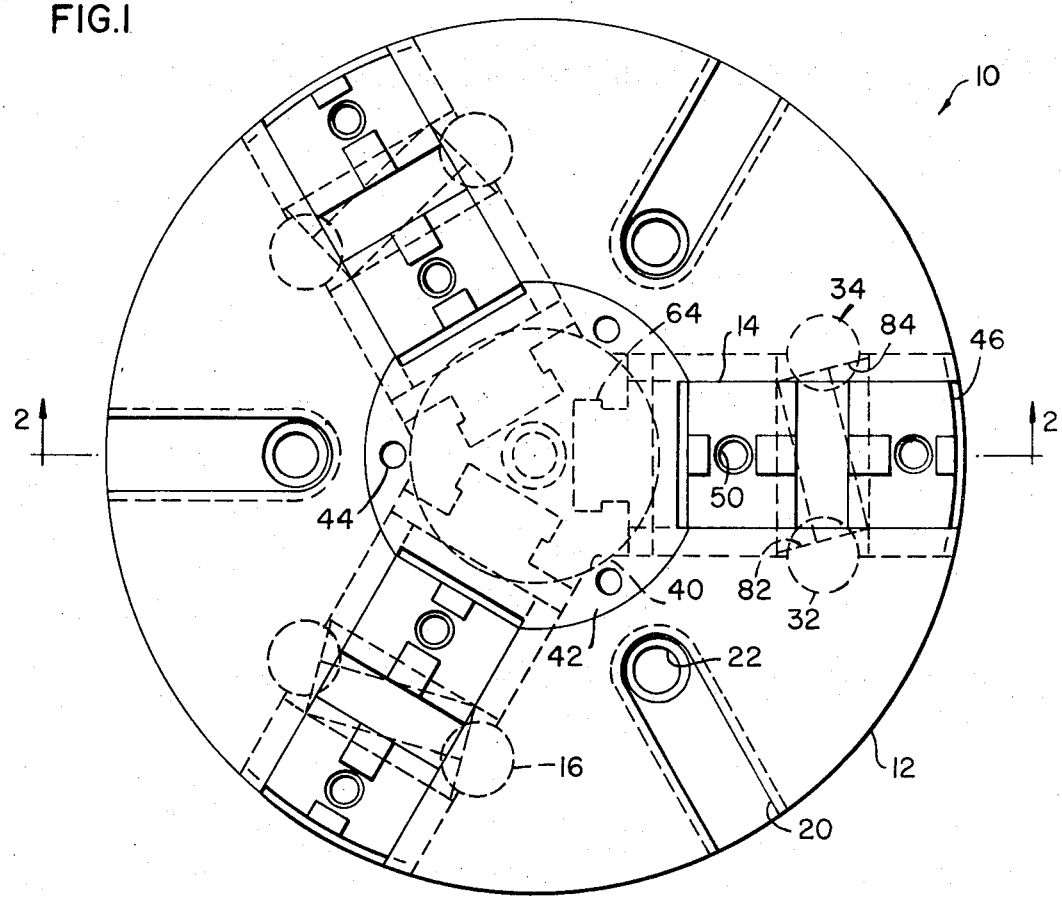
FIG. 1 is a plan view of compound chuck structure constructed in accordance with the invention.

The compound chuck structure 10 illustrated in FIG. 1 includes a body member 12, a plurality of angularly spaced apart jaw structures 14 and compound actuating structures 16 operable between the jaw structures 14 and drawbar structure 18.

The body member 12 includes the radially extending recesses 20 positioned angularly therearound as shown in FIG. 1 and the bolt passage 22 within the recesses 20 whereby the body member may be mounted on a lathe or the like for rotation about the axis of generation 24 or thereof. The body member 12 is further provided with the radially extending openings 26 therein in which the jaw structures 14 and actuating structures 16 are mounted.

Figure 2:
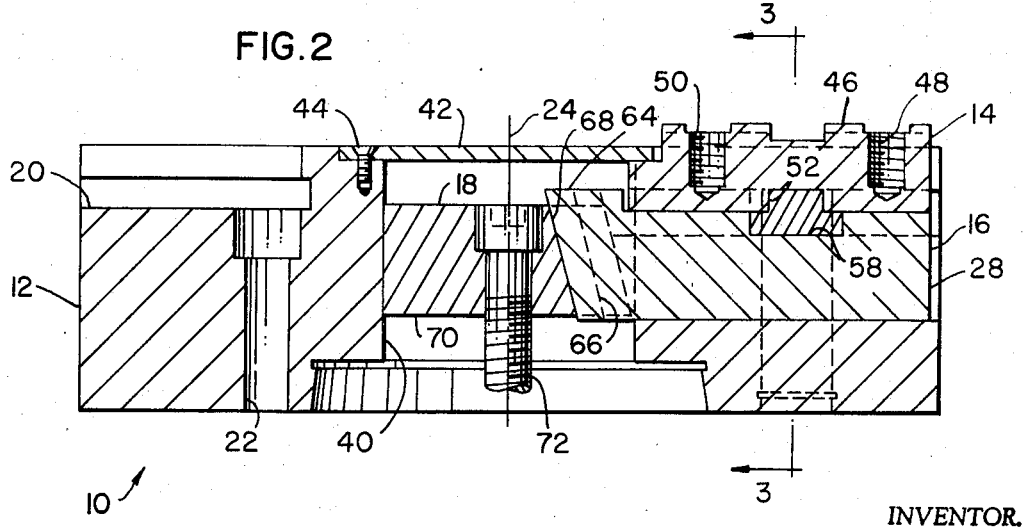
FIG. 2 is a section view of the compound chuck structure illustrated in FIG. 1 taken substantially on the line 2—2 in FIG. 1.
Figure 3:
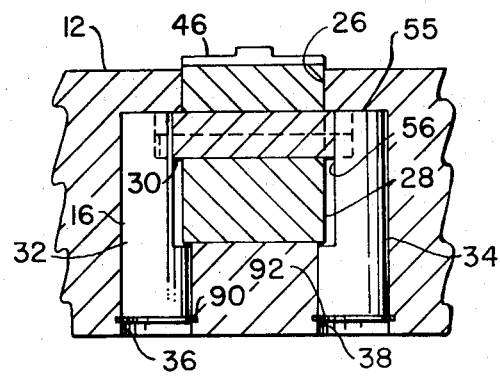
FIG. 3 is a section view of the compound chuck structure illustrated in FIG. 1 taken substantially on the line 3—3 in FIG. 2.

The pins 32 and 34 of the actuating structures 16 are secured in axially extending openings 36 and 38 in the chuck body member 12, as shown. The body member 12 is provided with a central cylindrical opening 40 in which the drawbar structure 18 for actuating the chuck structure 10 is reciprocally positioned as shown best in FIG. 2. A cover plate 42 as shown best in FIG. 2 may be secured over one end of the passage 40 through the chuck body 12 by convenient means such as screws 44, if desired.

The jaw structures 14 are entirely similar so that only one jaw structure 14 will be considered in detail. A jaw structure 14 includes the top jaw 46 having transversely extending channels 48 therein in which chuck jaws may be secured by convenient means such as bolts extending into the bolt openings 50 provided in the top jaw 46. Top jaw 46 further includes the channel 52 in the bottom thereof for receiving the inclined portion 54 of the center wedge 30 of a corresponding actuating structure 16. As shown best in FIG. 1, the channel 52 is inclined with respect to the radial direction of movement of the top jaw 46.

Movement of the top jaw 46 within the radially extending opening 26 radially of the chuck body 12 is produced on movement of the center wedge 30 perpendicular to a radius of the body member 12 due to the incline of the channel 52 with the force and distance of movement of the top jaw 46 being directly related to the angle of inclination of the channel 52 and the inclined portion of the wedge 30. Thus, with a four-to-one incline of the channel 52, the top jaw 46 will move radially inwardly or outwardly one-fourth the distance the center wedge 30 is moved transversely of the top jaw 46 and will cause clamping of a member between a jaw secured to the top jaw 46 and other similar jaws with a force which is four times that producing the transverse movement of the wedge 30. The top jaw 46 is held within the radial opening 26 by portions 55 extending outwardly of the top jaw 46 within an enlarged portion 56 of the radially extending opening 26.

A lower slide 28 which is part of the actuating structure 16 is positioned beneath each top jaw 46 and extends radially of the chuck body 12. The lower slide 28 is mounted in the enlarged portion 56 of the radially extending opening 26 for radial movement therein on axial movement of the drawbar structure 18. A channel 58 extends transversely of the lower slide 28 perpendicular to the direction of radial movement of the lower slide 28 for receiving the portion 62 of the center wedge member 30. Thus, the center wedge 30 positioned in the channel 58 is caused to move radially of the chuck body member 12 on radial movement of the lower slide 28.

The lower slide 28 is further provided with the T-shaped end 64 illustrated in FIG. 1 including the inclined surfaces 66 at each side thereof engageable with a mating inclined T-slot 68 in the head 70 of the drawbar structure 18 whereby on axial movement of the drawbar structure 18 through bolt 72 connecting the head 70 to a drawbar (not shown) the lower jaw 28 is caused to move radially a distance and with a force depending on the distance of axial movement of the drawbar structure 18 and the angle of the inclined surface 66 and mating T-slot in the head 70 of the drawbar structure 18. Thus, with a four-to-one inclination of the surface 66 the lower slide 28 will be caused to move radially one-fourth the distance of axial movement of the drawbar structure 18 and the force with which the lower slide 28 is moved radially is four times the force applied to the drawbar.

Figure 4:
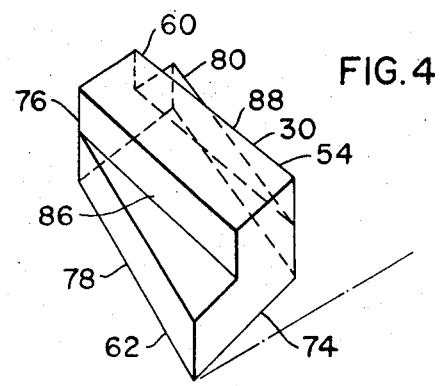
FIG. 4 is an enlarged perspective view of the center wedge of the compound chuck structure illustrated in FIG. 1.

The center wedge 30 which is also part of the actuating structure 16, as best shown in FIG. 4, includes the portion 62 having opposite ends 74 and 76 which are inclined with respect to the sides 78 and 80 with a slope of four-to-one, as shown, for engagement with the similarly inclined flat portions 82 and 84 on the pins 32 and 34 which will be considered subsequently. As previously pointed out, the portion 62 of the center wedge 30 is slidably received in the channel 58 in the lower slide 28. The portion 54 of the center wedge 20, again as best shown in FIG. 1, is inclined with respect to the radial direction of movement of the top jaw 46 and lower slide 28 and includes the inclined sides 86 and 88 engaged with the similarly inclined sides of the channel 52 in the top jaw 46 as previously indicated.

Pins 32 and 34 of the actuating structure 16 are secured in the openings 36 and 38 in the chuck body 12 by retaining rings 90 and 92 as previously indicated for free rotation about their axis of generation. The inclined flat surfaces 82 and 84 on the pins 32 and 34 engaged with the inclined surfaces 74 and 76 of the center wedge 30 cause movement of the wedge 30 transversely of the lower slide 28 and top jaw 46 on radial movement of the lower slide 28. The distance of transverse movement of the wedge 30 and the force of movement thereof will be determined by the angle of inclination of the surfaces 74 and 76. Thus, with a four-to-one slope on these surfaces, the wedge will be moved transversely one-fourth of the radial distance of movement of the lower slide 28 at a force four times as great as the force moving the lower slide 28 radially.

In overall operation of the chuck structure 10, when it is desired to chuck a member, jaws (not shown) are secured to the upper jaw members 46 in the usual manner. The member to be chucked is positioned axially of the chuck between the top jaws with the top jaws at a radially outer position thereof and the drawbar structure 18 is moved axially of the chuck structure 10; that is, down, in FIG. 2. Consequently, due to the inclined T-shaped slots in the drawbar structure head 70 and the T-shaped ends 64 on the lower slides 28 having the inclined surfaces 66 engaged with the head 70 of the drawbar structure 18 within the T slots 68, the lower slides 28 are moved radially inwardly one-fourth the distance of movement of the drawbar structure 18 and with four times the force of actuation of the drawbar structure 18.

Radially inward movement of the lower jaws 28 produces transverse movement of the center wedges 30 within the channels 58 and 52 due to the engagement of the end surfaces 74 and 76 with surfaces 82 and 84 of the pins 32 and 34. The transverse movement of the wedges 30 is again one-fourth the movement of the lower slides 28 radially and with four times the force of the radial movement of the lower slides 28 or 1/16th of the distance of movement of the drawbar structure 18 at sixteen times the force of axial movement of the drawbar structure 18.

Transverse movement of the wedge 31 will produce radial movement of the top jaws 46 due to the engagement of the surfaces 86 and 88 of the center wedges in the channels 52. The distance of radial movement of the top jaws 46 will again be one-fourth of the transverse movement of the center wedges 30 with a force four times the force of movement of the center wedges 30 or 1/64th of the movement at 64 times the force of movement of the drawbar structure 18.

Thus, it can be seen that with the compound jaw structure of the invention it is possible to chuck a member with 64 times the force of actuation of the drawbar structure 18. The ratio of force can, of course, be changed by changing the inclination of any of the inclined surfaces; that is, between the drawbar head and lower slide, between the center wedge and pins, and between the center wedge and top jaw structures. A corresponding change in the movement of the top jaws with respect to movement of the drawbar may also be accomplished.

In addition to the ability to provide increased chucking power, the chuck structure 10 may be constructed with a much smaller body member radius for a given chucking force or for a given jaw travel than previous single action chuck structure whereby the dynamic weight on the spindle of a machine to which the chuck is secured is reduced. Increased jaw travel in the chuck structure 10 is as indicated above particularly advantageous in conjunction with automatic loading of the chuck structure.

Figure 6:
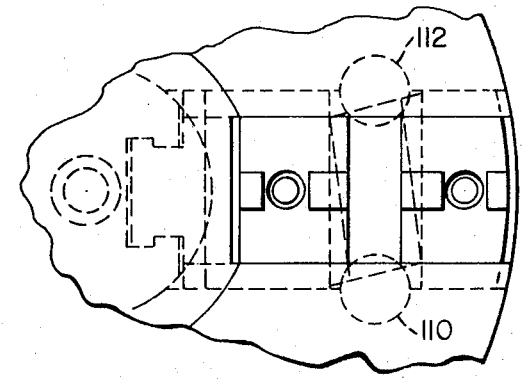
FIG. 6 is a partial plan view of the compound chuck structure illustrated in FIG. 5 taken in the direction of arrow 6 in FIG. 5.
Figure 5:
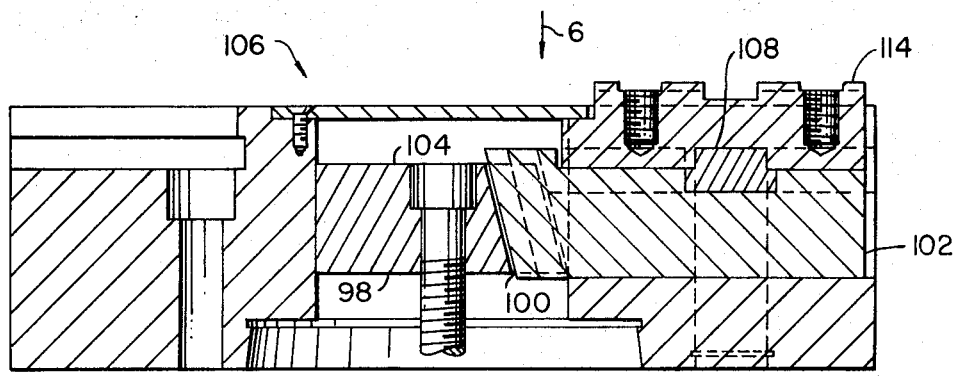
FIG. 5 is a section view similar to FIG. 2 of a modification of the compound chuck structure illustrated in FIG. 1.

As shown best in FIGS. 5 and 6, the drawbar head 98 or the lower slide 102 or both may be constructed to provide clearance 100 therebetween with the drawbar structure 104 actuated to chuck a workpiece. The clearance 100 permits considerable travel of the drawbar head 98 in the direction opposite to the actuating direction therefor whereby the slide 102 may be jolted to loosen the chuck structure 106 where necessary. Similarly, as previously pointed out, the width of the center wedge 108 is sufficient to permit insertion of a knocker at the side of the pins 110 and 112 if necessary to loosen the wedge 108 where the wedge is provided with a locking angle in engagement with the top jaw 114.

While one embodiment of the present invention is considered in detail, it will be understood that other embodiments and modifications thereof are contemplated. For example, the invention is not limited to a wedge-type chuck, but could also be implemented in chucks having a bell crank or other design to provide a compound chucking force and variable movement. It is therefore intended to include all of the embodiments and modifications as are defined by the appended claims within the scope of the invention.

What I claim as my invention is:

1. Compound chuck structure comprising jaw structure, a body member adapted to be rotated about an axis therethrough and including means supporting the jaw structure for radial movement toward and away from the axis of rotation of the body member to secure a workpiece to the chuck structure, compound actuating means carried by the body member and engaged with the jaw structure for moving the jaw structure radially of the base on actuation of the actuating means with a force and through a distance which force and distance are compound multiples of an actuating force applied to the actuating means and the actuating distance through which the actuating force is moved respectively and means for actuating the actuating means with the actuating force moved through the actuating distance, wherein the means for actuating the actuating means includes drawbar structure having an inclined surface thereon, and the compound actuating means includes a lower slide having an inclined surface thereon in engagement with the inclined surface on the drawbar whereby movement of the drawbar axially of the chuck body will produce movement of the lower slide radially of the chuck body a distance and with a force determined by the angle between the inclined surfaces on the drawbar and the lower slide, and pins positioned at opposite sides of the lower slide extending axially of the chuck base and carried thereby, which pins have oppositely inclined flat surfaces thereon adjacent the top jaw structure and a center wedge positioned between the lower slide and top jaw including inclined end surfaces in engagement with the inclined surfaces of the pins whereby the wedge is moved transversely of the lower slide and top jaw on movement of the lower slide radially of the chuck body member a distance and with a force determined by the incline of the inclined pin and center wedge surfaces.

2. Structure as set forth in claim 1, wherein the center wedge includes a portion inclined at an angle to the radial direction of movement of the top jaw and the top jaw includes an inclined recess in the bottom thereof receiving the inclined portion of the wedge whereby on movement of the wedge transversely of the top jaw the top jaw is moved radially of the chuck body member with a force and by an amount determined by the angle of inclination of the inclined portion of the wedge and the inclined recess.

3. Structure as set forth in claim 2, wherein the angle of inclination of the inclined portion of the center wedge with respect to the top jaw of the chuck structure is an angle which prevents movement of the wedge transversely of the top jaw structure due to radial forces on the top jaw.

4. Structure as set forth in claim 3, wherein the center wedge extends radially of the chuck structure at each end a greater distance than the adjacent pin to permit use of a knocker for moving the center wedge transversely of the top jaw to release the top jaw for radial movement.

5. Chuck structure comprising at least one top jaw structure, a cylindrical body portion including means for mounting the cylindrical body portion for rotation about the axis of generation thereof and means supporting the top jaw structure for movement radially of the chuck body portion, a lower slide, means supporting the lower slide within the body portion beneath the top jaw structure for movement radially of the chuck body portion, said lower slide including inclined surfaces thereon, and drawbar structure having inclined surfaces thereon in engagement with the inclined surfaces on the lower slide movable axially of the chuck structure to produce movement of the lower slide radially of the chuck structure with a force and of a distance dependent upon the angle of the inclined surfaces on the lower slide and drawbar structure and compound actuating means positioned between the lower slide and top jaw for moving the top jaw radially of the chuck structure in response to radial movement of the lower slide a distance and with a force which are multiples of the movement of the lower slide and the force producing the movement of the lower slide.

6. Structure as set forth in claim 5, wherein the compound actuating means comprises a pair of pins extending axially of the chuck structure on opposite sides of the jaw structure and lower slide having flat surfaces inclined in opposite directions to the top jaw, a center wedge positioned between the pins having inclined end surfaces in engagement with the inclined flat surfaces of the pins including a portion extending transversely of the lower slide positioned within a recess in the lower slide for movement transversely of the lower slide on radial movement of the lower slide and including a second portion inclined to the direction of radial movement of the top jaw positioned within a similarly inclined recess in the top jaw whereby the top jaw is moved radially on movement of the wedge transversely of the top jaw a distance and with a force determined by the angle of inclination of the second portion of the wedge with respect to the radial direction of movement of the top jaw and the force with which the wedge is moved transversely of the top jaw.

7. Structure as set forth in claim 8, wherein three jaw structures are angularly spaced equally from each other about the chuck body portion, clearance is provided between the draw bar and the lower slide members to permit lost motion on reversal of the direction of movement of the drawbar whereby the lower slide members may be jolted on reverse movement of the drawbar and the wedge members extend radially of the body portion beyond the pins to permit the wedge members to be moved radially with knocker members.

* * * * *